US010545580B2

(12) United States Patent
Yang et al.

(10) Patent No.: US 10,545,580 B2
(45) Date of Patent: Jan. 28, 2020

(54) 3D INTERACTION METHOD, DEVICE, COMPUTER EQUIPMENT AND STORAGE MEDIUM

(71) Applicant: Shenzhen Starfield Information Technologies Co., Ltd., Shenzhen, Guangdong Province (CN)

(72) Inventors: Yantao Yang, Shenzhen (CN); Ting Zhang, Shenzhen (CN); Junqing Fang, Shenzhen (CN); Ting Cao, Shenzhen (CN)

(73) Assignee: SHENZHEN STARFIELD INFORMATION TECHNOLOGIES CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 15/956,691

(22) Filed: Apr. 18, 2018

(65) Prior Publication Data

US 2019/0179417 A1    Jun. 13, 2019

(30) Foreign Application Priority Data

Dec. 11, 2017    (CN) .......................... 2017 1 1307868

(51) Int. Cl.
| | |
|---|---|
| *G06F 3/01* | (2006.01) |
| *G06K 9/00* | (2006.01) |
| *G06F 3/03* | (2006.01) |
| *G06F 3/042* | (2006.01) |

(52) U.S. Cl.
CPC ............ *G06F 3/017* (2013.01); *G06F 3/0304* (2013.01); *G06F 3/0425* (2013.01); *G06K 9/00355* (2013.01)

(58) Field of Classification Search
CPC ............................ G06F 3/017; G06K 9/00355
See application file for complete search history.

(56) References Cited

U.S. PATENT DOCUMENTS

| | | | | |
|---|---|---|---|---|
| 2008/0005703 | A1* | 1/2008 | Radivojevic | G06F 1/1626 715/863 |
| 2009/0103780 | A1* | 4/2009 | Nishihara | G06F 3/017 382/103 |
| 2014/0184496 | A1* | 7/2014 | Gribetz | G02B 27/017 345/156 |
| 2015/0062004 | A1* | 3/2015 | Rafii | G06F 3/017 345/156 |

(Continued)

*Primary Examiner* — Scott T Baderman
*Assistant Examiner* — Seung Woon Jung
(74) *Attorney, Agent, or Firm* — Frank Gao, Esq.; ABC Patent Services, LLC

(57) ABSTRACT

The embodiment of the present application discloses a 3D interaction method, device, computer equipment and storage medium. The method comprises the steps of acquiring motion trail data of a gesture; identifying hand joint position information of the gesture based on the motion trail data; identifying a trigger as a corresponding trigger gesture to realize an interaction operation in an interactive interface based on stay or movement of the hand joint position information within a preset time, wherein the gesture is within an acquisition scope of non-contact gesture control equipment. Thus, the usability of non-contact gesture recognition is improved and the misjudgment rate is reduced with higher operational fluency, better compatibility and improved user experience.

2 Claims, 3 Drawing Sheets

(56) References Cited

U.S. PATENT DOCUMENTS

| | | | |
|---|---|---|---|
| 2015/0346829 A1* | 12/2015 | Chang | G06F 3/017 345/156 |
| 2016/0132124 A1* | 5/2016 | Nakamura | G06K 9/00355 345/156 |

* cited by examiner

3D INTERACTION METHOD, DEVICE, COMPUTER EQUIPMENT AND STORAGE MEDIUM

CROSS REFERENCE TO RELATED APPLICATIONS

This application claims priority to Chinese patent Application No. 201711307868.6 filed with the Chinese Patent Office on Dec. 11, 2017, entitled "3D Interaction Method, Device, Computer Equipment and Storage Medium", which is incorporated herein by reference in their entirety.

TECHNICAL FIELD

The present application relates to the technical field of gesture recognition, in particular to a 3D interaction method, device, computer equipment and storage medium.

BACKGROUND

With gradually accelerated upgrading speed of electronic products (such as computer) and increasing improvement of performance and popularity of hardware equipment, various kinds of equipment have grown into people's life. This results in various kinds of touch hardware on account that touch operation is more in line with the life style of human beings and is more convenient. With the gradual popularization of the touch mode, inconvenience and limitation of touch operation has appeared. A small-size touch panel does not necessarily meet the display effect requirement of a large-area scene; instead, touch operation is very inconvenient if the screen is too large. From this, the touch operation could not still allow the operation to get out of operating hardware. Moreover, contact electronic equipment will take a variety of bacteria and viruses in the public place, causing a number of hygienic problems.

With the increasingly obvious digital content 3D (VR and AR are 3D contents) trend, the demand for non-contact control by virtue of natural gestures have been more and more apparent. Recently, AR equipment similar to Hololens provides simple air gesture operations, only including such two basic gestures as bending a finger to click and making the palm upward to show an open action, which cannot meet the complicated content production demands. On account that Kinect equipment has a high requirement on an operation scene and a certain requirement on distance, an action cannot be captured if a distance is too close, and an operator will feel tired after standing for a long time since it is generally operated at his feet. In other words, the current non-contact gesture recognition is poor in usability, low in error correction ratio, low in operation fluency and high in misjudgment rate.

SUMMARY

The embodiment of present application provides a 3D interaction method, device, computer equipment and storage medium, all of which are used for lowering gesture operation misjudgment rate and improving operation fluency.

The 3D interaction method provided by the embodiment of present application, comprising:

acquiring the motion trail data of the gesture by non-contact gesture control equipment identifying the hand joint position information of the gesture based on the motion trail data identifying a trigger as a corresponding trigger gesture to realize an interaction operation in an interactive interface based on stay or movement of the hand joint position information within a preset time, wherein the gesture is within an acquisition scope of the non-contact gesture control equipment.

Optionally, the step of identifying the hand joint position information of the gesture based on the motion trail data comprises:

identifying the hand joint position information of the gesture based on the motion trail data, the hand joint position information includes fingertip coordinates of five fingers and a wrist coordinate, or fingertip coordinates of five fingers and a palm coordinate.

Optionally, the step of identifying the trigger as the corresponding trigger gesture to realize the interaction operation based on stay or movement of the hand joint position information within the preset time comprises:

identifying as a single-finger stay trigger when an accumulated displacement deviation of only one staying finger is less than a first threshold distance and other fingers are of a boxing shape within a first preset time;

identifying as a multi-finger stay trigger when an accumulated displacement deviation of at least two staying fingers is less than a second threshold distance and other fingers are of a boxing shape within a second preset time;

Optionally, the step of identifying the trigger as the corresponding trigger gesture to realize the interaction operation based on stay or movement of the hand joint position information within the preset time comprises:

identifying as a forward single-finger trigger when the accumulated displacement deviation of only one finger moving to a screen direction is greater than a third threshold distance and an accumulated angle deviation is less than a first threshold angle, as well as other fingers are of a boxing shape within a third preset time, wherein the screen is used for displaying the interactive interface;

identifying as a forward multi-finger trigger when the accumulated displacement deviation of at least two fingers moving to the screen direction is greater than a fourth threshold distance and the accumulated angle deviation is less than a second threshold angle, as well as other fingers are of a boxing shape within a fourth preset time, wherein the screen is used for displaying the interactive interface.

Optionally, the step of identifying the trigger as the corresponding trigger gesture to realize the interaction operation based on stay or movement of the hand joint position information within the preset time comprises:

identifying to enter a drag operation when a distance between a thumb and a forefinger is less than a fifth threshold distance;

identifying as a frontward-backward drag gesture if a drag direction of the drag operation is vertical to the screen direction;

identifying as a left-right drag gesture if the drag direction of the drag operation is parallel to the screen direction and moves in a horizontal direction;

identifying as an up-down drag gesture if the drag direction of the drag operation is parallel to the screen direction and moves in a direction vertical to the ground;

identifying as a mixed drag gesture if the current drag gesture does not meet any condition of the front-back drag, left-right drag and up-down drag.

Optionally, the step of identifying the trigger as the corresponding trigger gesture to realize the interaction operation based on stay or movement of the hand joint position information within the preset time comprises:

identifying as a return operation when the gesture waves from right to left, a movement distance is greater than a sixth threshold distance, a speed is greater than a first threshold speed and an angle between the movement direction of the gesture and a direction parallel to the screen is less than a third threshold angle;

identifying as a movement operation when the gesture does not conform to a preset gesture trigger condition within the acquisition scope of the non-contact gesture control equipment.

Optionally, after the step of identifying the hand joint position information of the gesture based on the motion trail data, the method further comprises:

identifying the trigger of the hand joint position information moving forwards within a preset time as a corresponding trigger gesture if a ratio of a motion vector of a virtual space to a narrow edge size of a menu in the interactive interface is less than a preset ratio;

identifying the staying of the hand joint position information within the preset time to trigger identifying as a corresponding trigger gesture if the ratio of the motion vector of the virtual space to the narrow edge size of the menu in the interactive interface is greater than the preset ratio, wherein the motion vector of the virtual space is a product of a finger displacement deviation and a mapping between a real space and the virtual space;

or identifying the forward movement of the hand joint position information within the preset time to trigger identifying as a corresponding trigger gesture if the preset time is less than a threshold time;

identifying the staying of the hand joint position information within the preset time to trigger identifying as a corresponding trigger gesture when the preset time is greater than the threshold time.

A 3D interaction device provided by the embodiment of present application, comprising:

a gesture acquisition module, used for acquiring motion trail data of a gesture by non-contact gesture control equipment;

a position calculation module, used for identifying hand joint position information of the gesture based on the motion trail data;

a gesture recognition module, used for identifying a trigger as a corresponding trigger gesture to realize an interaction operation in an interactive interface based on stay or movement of the hand joint position information within a preset time, wherein the gesture is within an acquisition scope of non-contact gesture control equipment.

Computer equipment provided by the embodiment of present application, comprising a memory and a processor, wherein the memory stores a computer program, and a processor executes steps of the 3D interaction method when the computer program is executed by the processor.

A computer-readable storage medium provided by the embodiment of present application, with a computer program stored thereon, wherein the aforesaid 3D interaction method is realized when the computer program is executed by the processor.

As can be seen from the above technical solution, the embodiment of the present application has the following advantages:

In this embodiment, the method comprises the steps of acquiring motion trail data of a gesture; identifying hand joint position information of the gesture based on the motion trail data; identifying a trigger as a corresponding trigger gesture to realize an interaction operation in an interactive interface based on stay or movement of the hand joint position information within a preset time, wherein the gesture is within an acquisition scope of non-contact gesture control equipment. Thus, the usability of non-contact gesture recognition is improved and the misjudgment rate is reduced with higher operational fluency, better compatibility and improved user experience.

DETAILED DESCRIPTION

Figure 1:
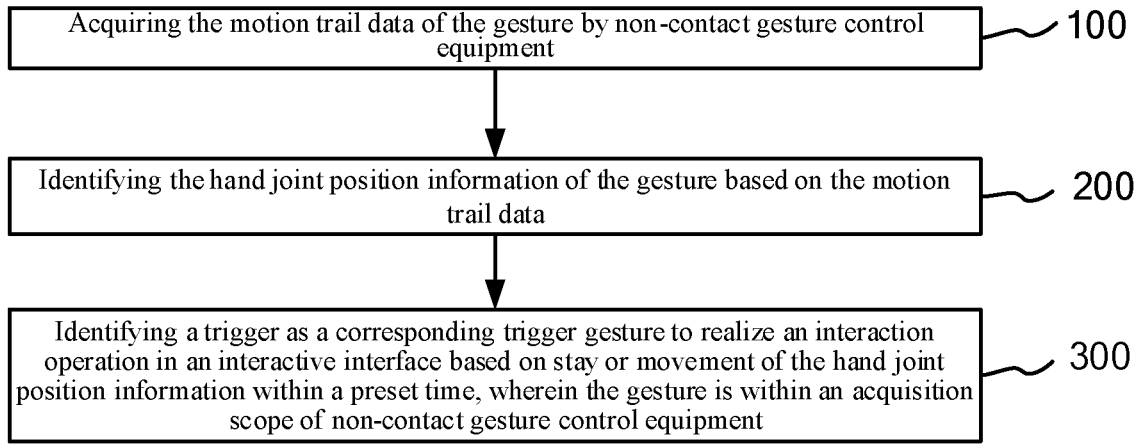
FIG. 1 is a schematic diagram of an embodiment of a 3D interaction method provided by the embodiment of present application.

The embodiment of present application provides a 3D interaction method, device, computer equipment and storage medium, all of which are used for lowering gesture operation misjudgment rate and improving operation fluency. To enable the purposes, features and advantages of the present invention to be more obvious and easier to understand, the following paragraphs will illustrate the specific implementations of the present invention with the appended drawings in details. Many specific details will be depicted below to facilitate the full understanding of the present invention. Nevertheless, the present application can be implemented by many other different means described herein. A person skilled in the art can do similar improvements without prejudice to the meanings hereof. Thus, the present application is not limited by the specific implementations disclosed below. Unless otherwise defined, all technical and scientific terms used herein have the same meaning as those generally understood by a person skilled in the art belonging to the technical field of the present invention. All terms used in the Description of the present invention only aim to describe the specific embodiments, rather than limiting the present invention. All technical features of the above embodiments can be combined arbitrarily. In an attempt to make the description concise, all possible combinations of all technical features in the above embodiments are not depicted. However, combinations of these technical features without contradiction should be regarded as scopes recorded in the Description.

The following paragraphs will describe the specific flow in the embodiment of present application. By referring to FIG. 1, one embodiment of the 3D interaction method in the embodiment of present application comprises:

100. Acquiring the motion trail data of a gesture by non-contact gesture control equipment.

In this embodiment, the present application provides a non-contact gesture recognition system, which acquires gesture data of a person through non-contact gesture control equipment, so as to correspondingly control an interactive interface for realization of 3D interaction. Regarding hardware for acquiring data in practical use, non-contact gesture control hardware (such as Leap Motion) can be embedded and hidden into the scene well for it is as large as a palm. On this basis, a user can sit down to operate it by only waving the palm due to the fact that the entire hardware and an operating space occupy a small position. Preferably, the acquired hand data acquisition hardware is: Such equipment as Leapmotion, Realsense and the like can input fine movements of both hands, and other acquisition equipment meeting the number of hand joints and data precision can be applied.

200. Identifying hand joint position information of the gesture based on the motion trail data.

In this embodiment, the non-contact gesture control equipment is used for acquiring motion trails of the gesture, and then transmitting to the computer equipment for algorithm processing, and finally identifying hand joint position information of the gesture. In the prior art, hand joints of the gesture can be realized by a variety of algorithms, for instance, a fingertip algorithm, a palm algorithm and a wrist algorithm can identify fingertip, palm and wrist parts of the gesture in the image. Certainly, these parts have the corresponding coordinates.

In practical use, the hand joint position information includes fingertip coordinates of five fingers and a wrist coordinate, or fingertip coordinates of five fingers and a palm coordinate. When gesture parts are identified by the embodiment of the present application, 6 key coordinates can be applied for the subsequent calculations, namely the wrist or the palm and the five fingertips. Due to such part selection way, the subsequent algorithms take accuracy and operation efficiency into account. Of course, according to the present application, coordinates of all parts of the gesture can be further applied for subsequent calculation, including coordinates at fingertips, palm and finger joints. Such selection way makes the subsequent calculation accuracy higher, but makes the calculated amount higher relatively. According to the present application, coordinates of the wrist joint (the palm is OK), a thumb tip, a forefinger tip, a mid-finger tip, a ring finger tip and a little finger tip are applied for calculation of subsequent gesture recognition. Each finger joint provided by the present application needs precise 3D space coordinate data provided by hand induction equipment, with precision lower than 1 mm. That is to say, 6 key coordinates actually used for gesture calculation includes 5 fingertip coordinates and the palm coordinate or the wrist coordinate.

300. Identifying a trigger as a corresponding trigger gesture to realize an interaction operation in an interactive interface based on stay or movement of the hand joint position information within a preset time, wherein the gesture is within an acquisition scope of the non-contact gesture control equipment.

In this embodiment, according to the hand joint position information, such as the fingertip coordinates, the wrist coordinate and the like, the gesture is within an acquisition scope of the non-contact gesture control equipment, namely the person's hand is sure to stay or move within a recognition scope of the non-contact gesture control equipment. The present application triggers preset gesture trigger conditions according to stay or movement of a hand joint of the gesture within the preset time, which is identified as a corresponding trigger gesture. The preset time, such as 0.4 s and 0.9 s, can be set according to actual conditions. By this way, the computer equipment can conduct interaction operation in the interactive interface after identifying the corresponding trigger gesture.

In practical use, the calculated gesture recognition results can be applied to planar 2D and 3D UI operations of computer end software. 2D menus with different visual effects cannot be obtained by rotating viewing angles; position can be defined by x and y in software generally, and size by width and height. 3D menus with different visual effects cannot be obtained by rotating viewing angles; position can be defined by x, y and z in software generally, and size by width, height and length. According to the present application, the 2D or 3D menu can be correspondingly operated by the identified gestures.

In the embodiment, the method comprises the steps of acquiring motion trail data of a gesture; identifying hand joint position information of the gesture based on the motion trail data; identifying a trigger as a corresponding trigger gesture to realize an interaction operation in an interactive interface based on stay or movement of the hand joint position information within a preset time, wherein the gesture is within an acquisition scope of non-contact gesture control equipment. Thus, the usability of non-contact gesture recognition is improved and the misjudgment rate is reduced with higher operational fluency, better compatibility and improved user experience.

Figure 2:
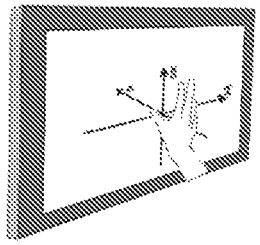
FIG. 2 is a schematic diagram of a space coordinate of the 3D interaction method provided by the embodiment of present application.

By referring to FIG. 2, a space coordinate as shown in FIG. 2, the following drawings and definitions, it is supposed that the palm is in front of the screen; a parallel screen is in a forward direction of an X axis from left to right; the parallel screen is a forward direction of a Y axis upwards from the bottom; a vertical screen is a forward direction of a Z axis from outside to inside. To be specific, a coordinate system is set on a screen, and then a gesture image acquired by the non-contact gesture control equipment is mapped on the screen to obtain coordinate information, so as to make a calculation based on a gesture recognition algorithm.

Figure 3:
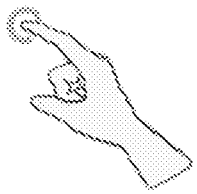
FIG. 3 is a schematic diagram of a single-finger stay trigger of the 3D interaction method provided by the embodiment of present application.
Figure 4:
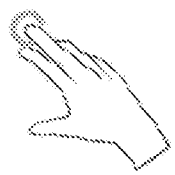
FIG. 4 is a schematic diagram of a multi-finger stay trigger of the 3D interaction method provided by the embodiment of present application.

By referring to FIGS. 3 and 4, furthermore, the step of identifying the trigger as the corresponding trigger gesture to realize the interaction operation based on stay or movement of the hand joint position information within the preset time comprises:

identifying as a single-finger stay trigger when an accumulated displacement deviation of only one staying finger is less than a first threshold distance and other fingers are of a boxing shape within a first preset time;

identifying as a multi-finger stay trigger when an accumulated displacement deviation of at least two staying fingers is less than a second threshold distance and other fingers are of a boxing shape within a second preset time;

In this embodiment, the present application presets recognition conditions of a plurality of trigger gestures. The hand staying in the menu or other interaction hotspots or moving forwards (to the screen direction) is regarded as the trigger gesture. The trigger gesture is an interaction behavior for the purpose of function selection, scene change and the like, which is the most common interaction means in software development. In an attempt to meet different application scenes, a plurality of trigger behaviors are defined in the present application, including the single-finger stay trigger or the multi-finger stay trigger.

According to the user's common operation habits, the single-finger stay trigger is illustrated below by taking the only one finger as the forefinger for an example: The user's forefinger is generally required to be forward and other fingers to be fisted, so that the forefinger is obviously farther away from a body end in space. How to identify single finger to be forward and other fingers to be fisted can be identified by a plurality of current finger recognition algorithms, so it's no need to discuss it here. Furthermore, for instance, the trigger is identified as the single-finger stay trigger when the forefinger stays in the hotspot and an accumulated displacement deviation $\Sigma_{t-i}{}^{t}P_{delta}$ of the forefinger tip is less than a first threshold distance within a first preset time. $P_{delta}$ is a length of a difference vector between a forefinger position $P_t$ of a current frame and a forefinger position $P_{t-1}$ of a last frame. It is supposed that the current time is t, and $\Sigma_{t-i}{}^{t}P_{delta}$ is a sum of position deviation values of the forefinger tip in a $\{t-i,t\}$ time period, namely the trigger is identified as the single-finger stay trigger during the period from t-i to t when t and i show time, if the sum of offsets of all frames is less than the first threshold. It should be noted that a time interval of the corresponding frame is ¹⁄₂₄ seconds when a conventional image is 24 frames per second. The frame provided by the present application is a basic unit for refreshing a screen of the 3D scene. When the ordinary scene has 30 frames or higher and a VR scene has 90 frames or higher, the corresponding time interval is equal to 1/frame (second). When the rendered frames of the 3D scene are restrained, the time interval and the frames are mutually converted and have equivalent achieving effects. A stay action is an instinctive reaction of a user interface for an interested object or hotspot during man-machine interaction, with the lowest use and learning costs. Of course, other single-finger stay trigger actions can be further identified, with the same recognition principle as that of the aforesaid forefinger stay trigger, so it's no need to discuss it here. The first threshold distance and the first preset time can be set according to actual conditions.

With respect to the multi-finger stay trigger, a multi-finger stay trigger action does not demand the user to have a special hand motion, so that the hand can bend or extend naturally. During the user's operation, the position of the finger (namely a maximum z axis branch of a hand sensor) nearby the screen end is calculated in real time. Its position at the time t is taken as $P_t$ to replace the forefinger position in the single-finger stay trigger, and other calculation methods are identical. The multi-finger trigger does not demand the user to learn the hand motion and only needs to make a natural response, so it has a lower use and learning cost than that of the single-finger stay trigger. The value of the second threshold distance can be set to be the same as or different from the first threshold distance according to actual conditions. The second preset time can be set to be the same as or different from the first preset time according to actual conditions.

Figure 5:
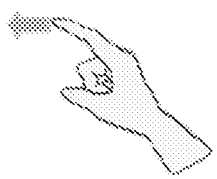
FIG. 5 is a schematic diagram of a forward single-finger trigger of the 3D interaction method provided by the embodiment of present application.
Figure 6:
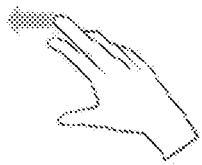
FIG. 6 is a schematic diagram of a forward multi-finger trigger of the 3D interaction method provided by the embodiment of present application.

By referring to FIGS. 5 and 6, furthermore, the step of identifying the trigger as the corresponding trigger gesture to realize the interaction operation based on stay or movement of the hand joint position information within the preset time comprises:

identifying as a forward single-finger trigger when the accumulated displacement deviation of only one finger moving to a screen direction is greater than a third threshold distance and an accumulated angle deviation is less than a first threshold angle, as well as other fingers are of a boxing shape within a third preset time, wherein the screen is used for displaying the interactive interface;

identifying as a forward multi-finger trigger when the accumulated displacement deviation of at least two fingers moving to the screen direction is greater than a fourth threshold distance and the accumulated angle deviation is less than a second threshold angle, as well as other fingers are of a boxing shape within a fourth preset time, wherein the screen is used for displaying the interactive interface.

To be specific, except for the aforesaid preset stay trigger behavior, the present application further sets a forward trigger behavior. The forward trigger refers to that the finger of the gesture moves to the screen direction, and the screen is used for displaying the interactive interface. For this, the user's hand can move to the screen direction to correspondingly operate the UI interface displayed on the screen.

The single-finger stay trigger is illustrated below by taking the only one finger as the forefinger for an example (certainly, the mid-finger, the ring finger and the like can be OK), the forefinger stays in the hotspot (namely a recognition scope of the non-contact gesture control equipment) and moves to the screen direction within the third preset time, its accumulated displacement deviation $\Sigma_{t-i}{}^{t}P_{delta}$ is greater than the third threshold distance, and the accumulated angle deviation $\Sigma_{t-i}{}^{t}A_{delta}$ is less than the first threshold angle, it is regarded as the forward single-finger trigger. The calculation methods of the accumulated displacement deviation $\Sigma_{t-i}{}^{t}P_{delta}$ and the single-finger stay trigger are the same. The accumulated angle deviation refers to an accumulated numerical value of an angle difference between finger movement and a vector of the vertical screen at the time $\{t-i,t\}$. It is supposed that $A_{delta}$ is a direction vector $V_t$ of the forefinger position $A_t$ of the current frame and the forefinger position $A_{t-1}$ of the last frame, the vector to the screen direction is $V_{forward}$, and an angle between $V_t$ and $V_{forward}$ is the position deviation value of $A_{delta}$ at the time t. Forward trigger has certain requirements on user's action standards, but conducts the trigger operation in the shortest time. The third threshold distance can be set according to actual conditions, for instance 1 m, etc.; the first threshold angle can be optionally selected, for instance, 15°, etc. Of course, other forward single-finger trigger actions can be further identified, with the same recognition principle as that of the aforesaid forward forefinger trigger, so it's no need to discuss it here.

With respect to the forward multi-finger trigger, the user is not needed to have a special hand motion, so that the hand can bend or extend naturally. During the user's operation, the position of the finger (namely a maximum z axis branch of a hand sensor) nearby the screen end is calculated in real time. Its position at the time t is taken as $P_t$ to replace the forefinger position in the forward single-finger trigger, and other calculation methods are identical. The fourth threshold distance can be set to be the same as or different from the third threshold distance according to actual conditions. The fourth preset time can be set to be the same as or different from the third preset time according to actual conditions. The second threshold angle can be set to be the same as or different form the first threshold angle.

Figure 7:
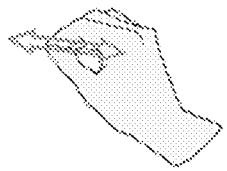
FIG. 7 is a schematic diagram of a front-back drag gesture of the 3D interaction method provided by the embodiment of present application.
Figure 8:
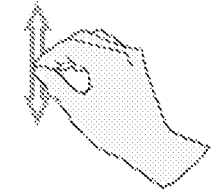
FIG. 8 is a schematic diagram of a left-right drag gesture of the 3D interaction method provided by the embodiment of present application.
Figure 9:
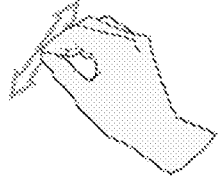
FIG. 9 is a schematic diagram of an up-down drag gesture of the 3D interaction method provided by the embodiment of present application.

By referring to FIGS. 7, 8 and 9, furthermore, the step of identifying the trigger as the corresponding trigger gesture to realize the interaction operation based on stay or movement of the hand joint position information within the preset time comprises:

identifying to enter a drag operation when a distance between a thumb and a forefinger is less than a fifth threshold distance;

identifying as a frontward-backward drag gesture if a drag direction of the drag operation is vertical to the screen direction;

identifying as a left-right drag gesture if the drag direction of the drag operation is parallel to the screen direction and moves in a horizontal direction;

identifying as an up-down drag gesture if the drag direction of the drag operation is parallel to the screen direction and moves in a direction vertical to the ground;

identifying as a mixed drag gesture if the current drag gesture does not meet any condition of the front-back drag, left-right drag and up-down drag.

This embodiment further defines the drag operation or dragging operation. In the 3D space, the object is frequently dragged, zoomed and rotated. Or, a camera is moved horizontally, rotated and pushed and pulled. After the user pinches the thumb by the forefinger, it is regarded to enter the drag operation, and four drag operations are distinguished by the environment. A determination way for entering the drag operation refers to that the thumb and forefinger tip positions are set to be $P_t$ and $P_i$, a vector module from the thumb to the forefinger is $|P_iP_t|$ less than a certain numerical value (namely a fifth threshold distance, a suggested value of which is 5 mm), so it is regarded to enter the drag operation. If the current time is t, the forefinger position is $PI_t$, the time of entering the drag is $t_0$, and the forefinger position is $PI_{t_0}$. Hence, the current drag vector $A_t=PI_t-PI_{t_0}$. The direction parallel to the screen is set to be $V_{right}$ from left to right, an inward direction vertical to the screen is $V_{forward}$, and the direction parallel to the screen is $V_{up}$ form bottom to top. The angle deviation threshold is set to be Ang=20°. Of course, the angle deviation threshold Ang can be set according to actual conditions.

Front-back drag: When the drag direction is vertical to the screen direction, it is regarded as a front-back drag gesture; namely ∠ $(A_t, V_{forward})$<Ang or ∠ $(A_t, -V_{forward})$<Ang; namely, an angle between the drag vector $A_t$ and a vector $V_{forward}$ of the direction of the vertical screen is less than 20 degrees, and it is regarded as the front-back drag;

Left-right drag: When the drag direction is parallel to the screen direction and moves in a horizontal direction, it is regarded as a left-right drag gesture; namely ∠ $(A_t, V_{right})$<Ang or ∠ $(A_t, -V_{right})$<Ang; namely, an angle between the drag vector $A_t$ and a vector $V_{right}$ of a left-right direction of the parallel screen is less than 20 degrees, and it is regarded as the left-right drag;

Up-down drag: When the drag direction is parallel to the screen direction and moves in a direction vertical to the ground, it is regarded as an up-down drag gesture; namely ∠ $(A_t, V_{up})$<Ang or ∠ $(A_t, -V_{up})$<Ang; namely, an angle between the drag vector $A_t$ and a vector $V_{up}$ of an up-down direction of the parallel screen is less than 20 degrees, and it is regarded as the up-down drag;

Mixed drag: The drag is regarded as a mixed drag gesture if the drag gesture does not meet any condition of the front-back drag, the left-right and up-down drag, or it is preset as the mixed drag gesture.

Figure 10:
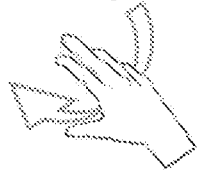
FIG. 10 is a schematic diagram of a return gesture of the 3D interaction method provided by the embodiment of present application.

By referring to FIG. 10, furthermore, the step of identifying the trigger as the corresponding trigger gesture to realize the interaction operation based on stay or movement of the hand joint position information within the preset time comprises:

identifying as a return operation when the gesture waves from right to left, a movement distance is greater than a sixth threshold distance, a speed is greater than a first threshold speed and an angle between the movement direction of the gesture and a direction parallel to the screen is less than a third threshold angle;

identifying as a movement operation when the gesture does not conform to a preset gesture trigger condition within the acquisition scope of the non-contact gesture control equipment.

To be specific, the aforesaid embodiment defines the stay gesture recognition, the forward gesture recognition and the drag gesture recognition. In the embodiment, the return gesture operation and the movement gesture operation are further defined. Specifically, the hand waves from right to left during non-contact and non-drag procedure, so as to meet that it is regarded as the return operation when a movement distance is greater than the sixth threshold distance (the proposed value is 20 cm or higher), the speed is greater than the first threshold distance (the proposed value is 0.5 m/s) and the angle of the parallel directions is less than the third threshold angle (the proposed value is 30 degrees). Instead, the hand is defined as movement which is generally served as an indicative symbol only when it is in a detectable scope but does not meet other gesture trigger requirements.

The present invention provides a control system based on non-contact gesture operation hardware, which can be directly applicable to non-contact operation of such user interfaces as computer, touch screen and projection. The control system can be applied to such non-mouse touch control 3D scenes as VR and AR. Moreover, the control system can be applied to creative 3D game input. A motion trail and a gesture of the suspending palm (including the wrist and five fingers) of the operator are acquired by virtue of the non-contact gesture control hardware, so as to control the system. When the current digital contents are converted from 2D to 3D, an abundant and efficient 3D spatial operation method with low misjudgment rate is required. The present invention provides an entire 3D spatial air operation scheme.

The present invention provides a whole set of carefully studied operation gestures applicable to different environments and functions. Such common operations as click, exit, selection, drag and rotation and the complicated operation as customized special combination can meet not only the daily demands, but also operation demands in the special environment. During research and development, the gesture correction is very high based on hundreds or thousands of experiments from the perspective of operation easiness, small amplitude and conformity to natural habit. Gesture data of different users is acquired during research and development, some non-standard operation gestures can be identified during the daily use, and some customary surplus gestures of human beings can be filtrated automatically. Taking into full consideration of portability of a hardware platform and good compatibility, it can be applied to different kinds of non-contact control hardware, thereby being applicable to all non-contact gesture control systems.

The following paragraphs will illustrate the specific gesture recognition algorithms and applications in the 3D interaction method provided by the present invention for details. It should be noted that the space between the frame and the time: The frame is the basic unit for refreshing the screen of the 3D scene. The ordinary scene has 30 frames or higher and the VR scene has 90 frames or higher. Time interval=1/frame (second). To simplify depiction and formulation expression, the frame is uniformly taken as an arithmetical unit in the followings. When the rendered frames of the 3D scene are restrained, the time interval and the frames are mutually converted and have equivalent achieving effects.

To be specific, the gesture is named the single-finger stay trigger; its gesture is defined as that: when other fingers bend, the forefinger is forward, a position of the 3D space is Pos and the current frame meets i=0; the forward n frames meet i=n; when the accumulated finger position deviation (sum of the vector lengths of the position deviations) is lower than the threshold $V_{threshold}$ in the continuous n frames, it is determined as the single-finger stay trigger; the formula is as follows:

$$\Sigma_{i=0}^{n}((Pos_i - Pos_{i+1}) \cdot magnitude) < V_{threshold},$$

where, i and n are integers.

The corresponding multi-finger stay trigger is served as a supplementation of the single-finger stay trigger. The multi-finger stay trigger refers to that the user applies the finger nearest the screen as a trigger point and executes the relevant trigger operations when making an unbending or bending natural gesture without interface guide and clear operating intentions. Guide operation or generic menu operation is in the majority. Three-dimensional positions of fingertips are Pos0, Pos1, Pos2, Pos3 and Pos4 respectively; Pos=Max (Pos0, Pos1, Pos2, Pos3, Pos4); by taking Pos to replace the forefinger coordinate of "single-finger stay trigger", conditions are determined to be the same.

The gesture of the forward single-finger trigger is defined as that: when other fingers bend, the forefinger is forward, the position of the 3D space is Pos and the current frame meets i=0; the forward n frames meet i=n;

the finger motion vector is: $V_{delta}=Pos_i-Pos_{i+1}$;
an inward screen vector is: $V_{forward}=(0,0,1)$;
an angle $Ang_{(d-f)}$ between $V_{delta}$ and $V_{forward}$ is:

$$Ang_{(d-f)} = arcos \frac{V_{delta} \times V_{forward}}{|V_{delta}| \times |V_{forward}|};$$

In the continuous n frame, the following two conditions are met synchronously: the movement distance between single fingertip and a Z positive axis direction is greater than $D_{threshold}$, and an angle between the single fingertip and $V_{forward}$ is less than $Ang_{threshold}$, with the formula as follows:

$$V_{delta} \cdot magnitude > D_{threshold};$$

$$Ang_{(d-f)} < Ang_{threshold};$$

If the two conditions are met simultaneously, it is regarded as the forward single-finger trigger.

The forward multi-finger trigger is served as a supplementation of the single-finger stay trigger. The multi-finger stay trigger refers to that the user applies the finger nearest the screen as a trigger point and executes the relevant trigger operations when making an unbending or bending natural gesture without interface guide and clear operating intentions. Three-dimensional positions of fingertips are Pos0, Pos1, Pos2, Pos3 and Pos4 respectively;

Pos=Max (Pos0, Pos1, Pos2, Pos3, Pos4); by taking Pos to replace the forefinger coordinate of "forward single-finger trigger", conditions are determined to be the same.

For the finger dragging, sub-gestures are named as: "left-right dragging", "up-down dragging" and "front-back dragging". In other words, the dragging gestures include three sub-gestures.

Definition for the gesture: the forefinger and the thumb pinch, and other fingers bend naturally, all of which move in the pinching state. The determination method is as follows:

When a spatial position of the palm is $Pos_{i=0}$, the forward n frame is $Pos_{i=n}$, a spatial position of the thumb is $TPos_i$, and a spatial position of the forefinger is $FPos_i$, the finger pinching conditions are as follows:

$$(TPos_i - FPos_i) \cdot magnitude < V_{thresholdmin};$$

and $$(TPos_{i+1} - FPos_{i+1}) \cdot magnitude > V_{thresholdmax};$$

where: $V_{thresholdmin}$ and $V_{thresholdmax}$ are dual thresholds, which can filtrate data deviation (the data has a certain deviation when the finger approaches) in switching "pinching" and "non-pinching" states.

On the contrary, the condition of loosening fingers is as follows:

$$(TPos_i - FPos_i) \cdot magnitude > V_{thresholdmax}$$

and $$(TPos_{i+1} - FPos_{i+1}) \cdot magnitude < V_{thresholdmin};$$

the current position $Pos_m$ is recorded in the "non-pinching-»pinching" state; the current position $Pos_n$ is recorded in the "pinching-»non-pinching" state;
the middle position is $Pos_i$.

$V_{forward}$, $V_{up}$ and $V_{right}$ respectively represent x, y and z axes, but positive and negative axes need to be considered in actual codes.

The positive axis is only considered in the following algorithms, so do the negative axis.

If:

$$arcos \frac{(Pos_i - Pos_m) \times V_{forward}}{|(Pos_i - Pos_m)| \times |V_{forward}|} < Angle_{threshold};$$

it is: the front-back dragging; namely, it is identified as a front-back dragging gesture under the condition of meeting the aforesaid formula.

If:

$$arcos \frac{(Pos_i - Pos_m) \times V_{up}}{|(Pos_i - Pos_m)| \times |V_{up}|} < Angle_{threshold};$$

it is: the up-down dragging; namely, it is identified as an up-down dragging gesture under the condition of meeting the aforesaid formula.

If:

$$arcos \frac{(Pos_i - Pos_m) \times V_{right}}{|(Pos_i - Pos_m)| \times |V_{right}|} < Angle_{threshold};$$

it is: the left-right dragging; namely, it is identified as a left-right dragging gesture under the condition of meeting the aforesaid formula.

If it meets the drag gesture requirements but does not meet the front-back drag, the up-down drag and the left-right drag, it is: a mixed drag.

The aforesaid stay trigger gesture and the forward trigger gesture can be applicable to such 3D interaction operations as menu selection and switch; on the contrary, the dragging operations can be applicable to such 3D interaction operations as scene browse and game element browsing.

With respect to time to trigger the stay gesture recognition and the forward gesture recognition, after the step of identifying the hand joint position information of the gesture based on the motion trail data, the method further comprises:

identifying the trigger of the hand joint position information moving forwards within a preset time as a corresponding trigger gesture if a ratio of a motion vector of a virtual space to a narrow edge size of a menu in the interactive interface is less than a preset ratio;

identifying the staying of the hand joint position information within the preset time to trigger identifying as a corresponding trigger gesture if the ratio of the motion vector of the virtual space to the narrow edge size of the menu in the interactive interface is greater than the preset ratio, wherein the motion vector of the virtual space is a product of a finger displacement deviation and a mapping between a real space and the virtual space;

or identifying the forward movement of the hand joint position information within the preset time to trigger identifying as a corresponding trigger gesture if the preset time is less than a threshold time;

identifying the staying of the hand joint position information within the preset time to trigger identifying as a corresponding trigger gesture when the preset time is greater than the threshold time.

To be specific, the stay trigger gesture and the forward trigger gesture include four gestures in total, which are collectively known as "trigger gesture". Similar implementations and application scenes are selected in practical use according to the following rules. The finger shakes and shifts naturally during stay keeping process, so that the finger moves forwards to improve convenience. Therefore, for the stability of operation, the stay state has the better stability than that of the forward movement, which can trigger finer contents. If it is supposed that the finger displacement deviation is X (the proposed value is 10 mm), the mapping between the real space and the virtual space is r (the motion vector of the real space is x, and the motion vector of the virtual space is X*r), the narrow edge size of the menu is y); if $$\frac{X \times r}{Y} < 1,$$

the forward trigger is applied, namely the trigger of the hand joint position information to move forwards within the preset time is identified as a corresponding trigger gesture; while if $$\frac{X \times r}{Y} > 1,$$

the stay trigger is applied, the trigger of the hand joint position information to stay within the preset time is identified as a corresponding trigger gesture. Preferably, the aforesaid formula can be served as a calculation formula of the menu size conversely.

Furthermore, the stay trigger needs long stay time to avoid confusion with an unconscious stay state. On the contrary, the previous trigger can be completed in a fraction of a second, the forward trigger operation is applied for the condition requiring quick actions (high time sensitivity). Specifically, the required trigger time is set to be t (namely the preset time), and the threshold time is 0.5 s. If t is supposed to be less than 0.5 s, it is applicable to the forward trigger; if t is supposed to be greater than 0.5 s, it is applicable to the stay trigger.

Furthermore, for a new software interface, a user will spend a long time in familiarizing it, and the rules required to memorize are more and more, so the learning cost is higher. Single-finger operation has requirements for finger gesture, generally requiring operational guidelines on UI, and the learning cost is high. Multi-finger operation has no requirements for finger gesture, and there is no learning cost. Single-finger operation is applicable to contents with long experience time (over 5 minutes), such as game, VR, AR contents. Multi-finger operation is applicable to recreational games in public places or content browsing; in general, there are a lot of users in public places, with short experience time, having no guidance.

The present invention solves the relevant problems of the traditional human-computer interaction techniques, widely supports interaction demands on 2D contents and 3D contents, provides a set of efficient UI solutions with low learning cost, provides flexible alternatives for conventional UI operation demands, templated interaction interfaces for 3D interaction contents, and a complete set of human-computer interaction solutions for public places, non-standard display equipment, etc.

Figure 11:
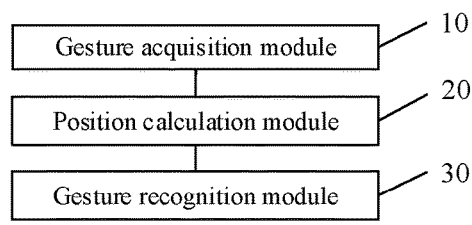
FIG. 11 is a schematic diagram of an embodiment of a 3D interaction device provided by the embodiment of present application.

Above describes the 3D interaction device in the embodiment of present application, and below will describe the 3D interaction device in the embodiment of present application:

Referring to FIG. 11, one embodiment of the 3D interaction device in the embodiment of present application comprises:

a gesture acquisition module 10, used for acquiring motion trail data of a gesture by non-contact gesture control equipment;

a position calculation module 20, used for identifying hand joint position information of the gesture based on the motion trail data;

a gesture recognition module 30, used for identifying a trigger as a corresponding trigger gesture to realize an interaction operation in an interactive interface based on stay or movement of the hand joint position information within a preset time, wherein the gesture is within an acquisition scope of non-contact gesture control equipment.

The specific function and structure of the 3D interaction device in the embodiment corresponding to FIG. 11 are used for achieving the steps of the 3D interaction method in the embodiment of FIG. 1, so repeated description will not be made here.

Figure 12:
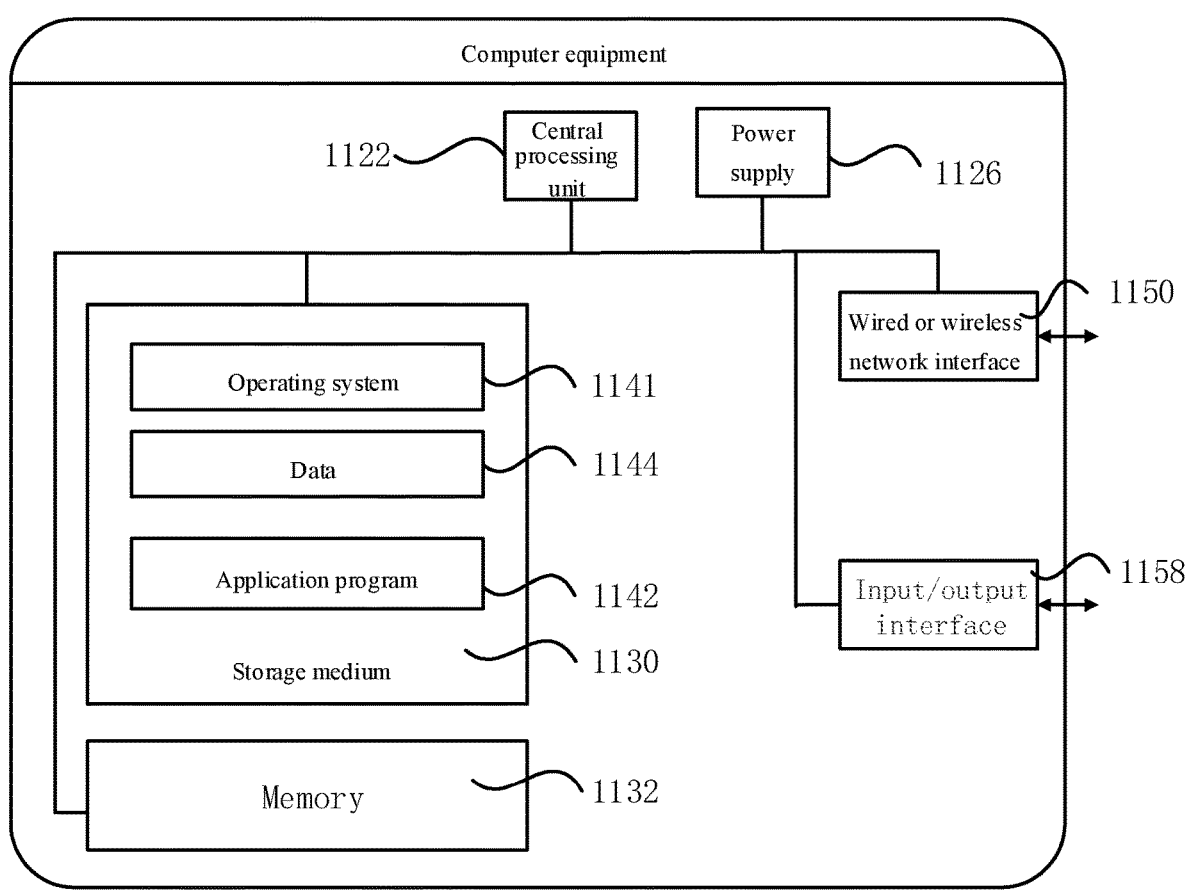
FIG. 12 is a schematic structural diagram of computer equipment provided by the embodiment of the application.

FIG. 12 is a schematic diagram of one embodiment of computer equipment in the embodiment of the application, specially comprising: The computer equipment can generate greater difference for different configurations or performances, and it can comprise one or more than one central processing unit (CPU) 1122 (e.g. one or more than one processing unit) and memory 1132, one or more than one storage medium 1130 used for storing application programs 1142 or data 1144 (e.g. one or more than one mass storage). The memory 1132 and storage medium 1130 can be used for transient storage or persistent storage. The program stored in the storage medium 1130 may comprise one or more than one module (not shown in the figure), and each module may comprise a series of instructions in the 3D interaction device. Furthermore, the central processing unit 1122 can be set to communicate with the storage medium 1130 for executing a series of instructions in the storage medium 1130 on the information management system.

The central processing unit is used for executing the following steps:

acquiring the motion trail data of the gesture by non-contact gesture control equipment identifying the hand joint position information of the gesture based on the motion trail data identifying a trigger as a corresponding trigger gesture to realize an interaction operation in an interactive interface based on stay or movement of the hand joint position information within a preset time, wherein the gesture is within an acquisition scope of the non-contact gesture control equipment.

The computer equipment can also comprise one or more than one power supply 1126, one or more than wired or wireless network interface 1150, one or more than one input/output interface 1158, and/or, one or more than one operating system 1141, e.g. Windows Server™, Mac OS X™, Unix™, Linux™, FreeBSD™.

The steps of the 3D interaction method described in FIG. 1 are achieved by the 3D interaction device based on the structure as shown in FIG. 12.

Those skilled in the art can clearly understand that for convenient and simple description, the specific working processes of the systems, the device and the units described above can refer to the corresponding processes in the foregoing method embodiments, and are not repeated here.

In several embodiments provided by the present application, it should be understood that, the disclosed system, device and method can be realized by other ways. For example, the above device embodiments are only schematic, e.g., the division of the unit is only one logic function division, and in fact the unit can be divided in another way, for example, multiple units or modules can be combined or integrated to another system, or some features can be omitted, or not executed. Another point is that, mutual coupling or direct coupling or communication connection displayed or discussed can be indirect coupling or communication connection of devices or units electrically, mechanically or by other forms through some interfaces.

The unit described as a separator can be or cannot be separated physically, the component displayed as a unit can be or cannot be a physical unit, i.e., can be located in one position, or can also be distributed on multiple network units. Some or all units therein can be selected to achieve the purpose of the present embodiment according to actual needs.

Moreover, all function units in each embodiment of the present application can be integrated in one processing unit, or all units can also physically exist independently, or two or over units are integrated in one unit. The unit can be integrated in the form of hardware, and can also be integrated in the form of software function unit.

If the unit is integrated in the form of software function unit and used as an independent product for sale or use, it can be stored in a computer-readable storage medium. Based on such understandings, the technical solutions or part or all of the technical solutions disclosed in the present invention that makes contributions to the prior art may be essentially embodied in the form of a software product which can be stored in a storage medium, comprising numerous commands for facilitating one computer equipment (e.g., a personal computer, a server or a network equipment) to execute part or all steps of the method described by the embodiments in FIG. 1 of the present application. However, the foregoing storage medium includes various mediums which can be used for storing program codes, such as U disk, mobile hard disk, Read-Only Memory (ROM), Random Access Memory (RAM), diskette or optical disk.

The above embodiments are merely provided for describing the technical solutions of the present invention, not limitation. Although the present application with reference to the aforesaid embodiments has been described in detail, a person skilled in the art should understand: They can also modify technical solutions recorded in the aforesaid embodiments, or equivalently replace some technical features therein; but these modifications or replacements will not make the nature of the corresponding technical solution depart from the spirit and scope of the technical solution in each embodiment of the present application.

What is claimed is:

1. A 3D interaction method, comprising, acquiring motion trail data of a gesture by non-contact gesture control equipment; identifying hand joint position information of the gesture based on the motion trail data; and identifying a trigger as a corresponding trigger gesture to realize an interaction operation in an interactive interface based on stay or movement of the hand joint position information within a preset time, wherein the gesture is within an acquisition scope of the non-contact gesture control equipment, wherein the step of identifying the trigger comprises:

identifying as a return operation when the gesture waves from right to left, a movement distance is greater than 20 centimeter, a speed is greater than 0.5 meter per second, and an angle between the movement direction of the gesture and a direction parallel to the screen is less than 30 degrees.

2. The method according to claim 1, wherein the step of identifying the trigger as the corresponding trigger gesture to realize the interaction operation based on stay or movement of the hand joint position information within the preset time comprises: identifying as a movement operation when the gesture does not conform to a preset gesture trigger condition within the acquisition scope of the non-contact gesture control equipment.

\* \* \* \* \*